United States Patent

[11] 3,542,472

[72] Inventor William Reid Smith-Vaniz
Darien, Connecticut
[21] Appl. No. 608,443
[22] Filed Jan. 10, 1967
[45] Patented Nov. 24, 1970
[73] Assignee The Perkins-Elmer Corporation
Norwalk, Connecticut
a corporation of New York

[54] DISTANCE MEASURING APPARATUS
11 Claims, 6 Drawing Figs.
[52] U.S. Cl. .................................................. 356/4;
343/14
[51] Int. Cl. .................................................. G01c 3/08
[50] Field of Search ........................................... 356/5, 4;
343/14

[56] References Cited
UNITED STATES PATENTS
2,966,824 1/1961 Granquist..................... 356/5
3,424,531 1/1969 Bender et al.................. 356/4

Primary Examiner—Rodney D. Bennett, Jr.
Assistant Examiner—Joseph G. Baxter
Attorney—Edward R. Hyde, Jr.

ABSTRACT: A distance measuring apparatus comprises a laser light source arranged for generating a light beam having simultaneously occurring components at two or more differing frequencies. Portions of the light beam are projected at a remotely positioned target reflective surface and at a locally positioned reference reflective surface. The distance measuring apparatus is arranged for combining beams reflected from these surfaces and for generating a field which varies in contrast in accordance with the displacement of the reference reflective surface from a reference point in the apparatus. The laser light source further includes means for altering a resonant cavity length thereof for varying $f$ where $f$ is the difference in frequency between the component frequencies. A knowledge of the frequency differential $f$ and a corresponding distance of the reference surface from the reference point provides sufficient data for the solution of simultaneous equations for indicating the distance of a remote target.

INVENTOR.
William R. Smith-Vaniz
BY
Frank J. Thompson
ATTORNEY.

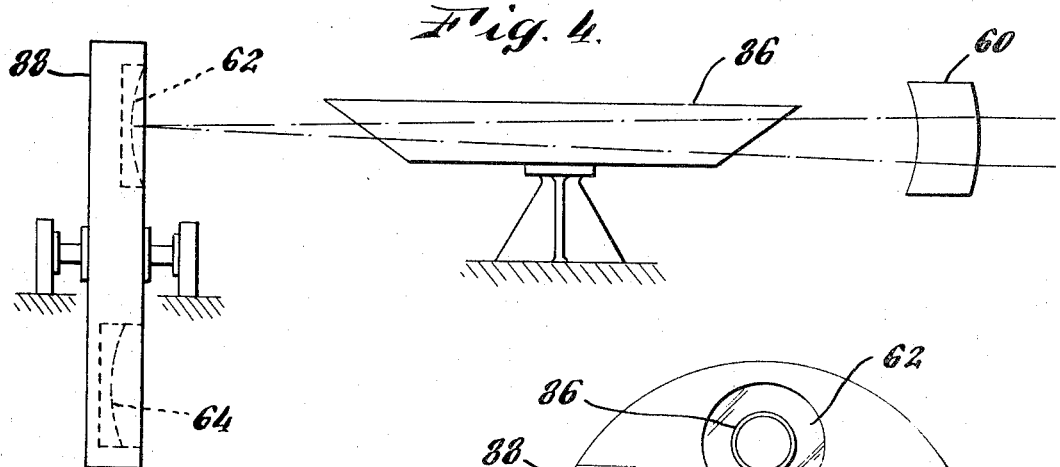
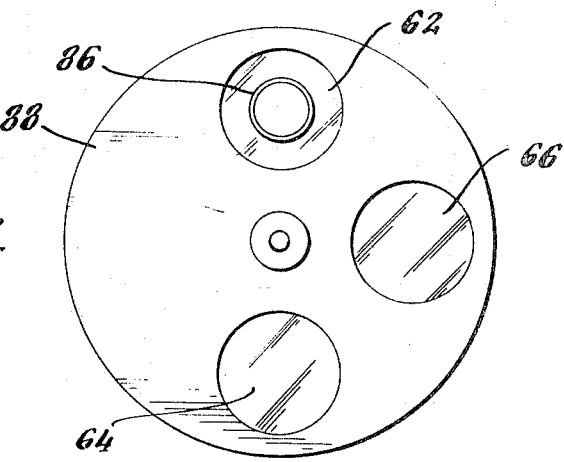
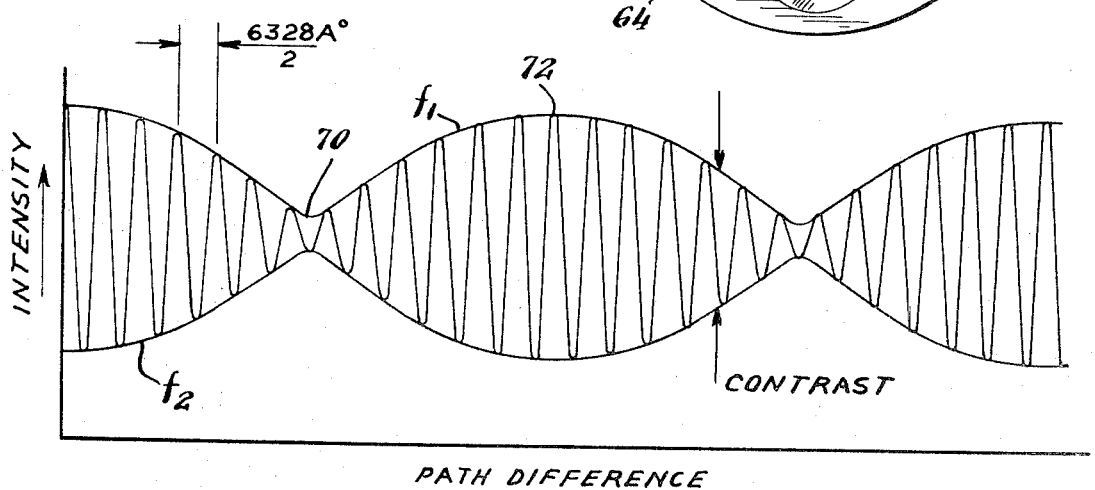
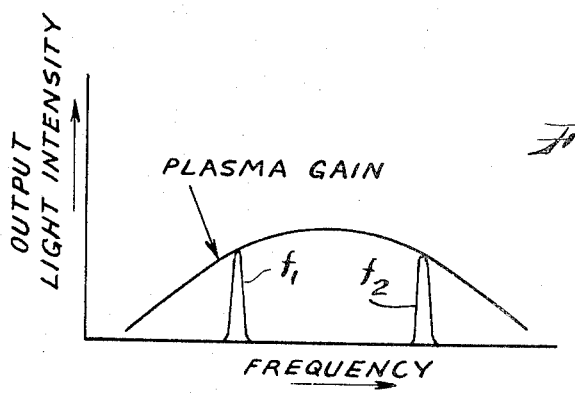

DISTANCE MEASURING APPARATUS

The present invention relates to apparatus for measuring the distance of a remotely positioned object. The invention relates more specifically to an improved form of apparatus particularly adapted for use in measuring distances over intermediate and relatively long intervals.

The need arises in various activities such as in the surveying arts for measuring distances over intervals such as several hundred feet with a relatively high degree of accuracy. This accuracy is desirably on the order of one one-hundredth of a foot. In known surveying methods, distances of this magnitude are generally tape measured. The accuracy of tape measurements is limited, however, by several factors such as the straightness of the path chosen between a reference point and the object whose distance is to be measured, the constancy of tension exerted on the measuring tape, and various errors arising from the use of intermediate reference points when the distance to be measured exceeds the length of the tape. In addition, physical tapes cannot be employed over certain types of terrain without requiring the clearing of obstacles or the interruption of processes.

Electromagnetic measuring means have been utilized to circumvent several of these problems. However, the accuracy of measurements obtainable with this apparatus is limited by the resolution of the equipment. This resolution, to a first order, is equal to $c/2\Delta f$ where $c$ is the velocity of light and $\Delta f$ is the bandwidth of the apparatus. Since the velocity of light is a physical constant, measurement accuracy is primarily determined by the bandwidth of the apparatus.

A first order resolution with apparatus of this type for a typical bandwidth of 30 mc. is approximately 16 feet. This first order resolution can be increased by measurement of the return to a fraction of a cycle but this measurement itself is subject to inaccuracies. In an exemplary form of electromagnetic distance measuring apparatus, a beam of light which is projected at a target whose distance is to be measured is amplitude modulated at an RF rate. This modulation is accomplished by electro-optical means operating responsive to an electrical signal provided by an oscillator. The light beam is reflected by the target and interpolation is accomplished by electrically comparing the phase of the AM component of the returning beam with the phase of the local RF signal. These apparatus, then, are primarily useful for measuring the distance of objects over a relatively long distance where the fixed error encountered would be tolerable.

It is an object of this invention to provide an improved apparatus adapted for measuring the distance of a remotely located object over both relatively long and intermediate distances with a relatively high degree of accuracy.

Another object of the invention is the provision of a surveying apparatus adapted for measuring distances on the order of 300 feet with a high degree of accuracy while eliminating the prior requirement for intermediate measuring stations, the interruption of processes, and the clearing of obstacles.

In accordance with the present invention, a distance measuring apparatus includes a laser light source arranged for generating a light beam and for projecting a first portion of the light beam at a remotely located reflective target surface and for projecting a second portion of the light beam at a locally positioned reference reflective surface. The light source is adapted for generating a light beam having two relatively widely spaced frequency components $f_1$ and $f_2$ for a particular resonant cavity length of the laser, the separation between $f_1$ and $f_2$ being approximately $C/2L$ where $L$ is the spacing between the cavity mirrors. Adjustable means, including the reference reflective surface, are provided for combining the beams, which are reflected from the target and reference surfaces, in a manner for generating a light field having a brightness which varies in intensity in accordance with a displacement $d_n$ of the reference reflective surface from a reference point in the apparatus. Means are also provided for measuring the distance $d_n$ of the reference reflective surface from the reference point. As either reflector is moved, alternations of constructive and destructive interference occur, one cycle of light-and-dark for each half-wavelength of light displacement.

Each of the reflected beams of light include the frequency $f_1$ and $f_2$, and variations in contrast in the combined beams occur in accordance with the difference in path length traveled by the beams. The maxima and minima of intensity due to the individual frequencies, having slightly different wavelengths, sometimes coincide to provide high contrast and sometimes oppose, giving low contrast. Maximum contrast, referred to hereinafter as a maxima, occurs at a zero path length differences and at integral multiples of $c/2\Delta f$ where $c$ is the velocity of light and $\Delta f = f_2 - f_1$. Minimum contrast, referred to hereinafter as a minima, occurs intermediate the maximas of intensity. When the amplitudes of the light at the frequency $f_1$ and $f_2$ are equal, the reference reflective surface can be moved a distance sufficient for causing the changes in intensity due to $f_1$ to be exactly countered by the changes due to $f_2$, causing a sharp decrease in contrast.

A distance D to the target is then given by:

$$D = \frac{C}{2\Delta f}\left(N + \frac{1}{2}\right) + d_n$$

Awhere, N is the number of minimas occurring in a wavefront between a beam splitter, which forms a reference point in the apparatus, and the target, and $d_n$ is the distance of the reference reflective surface to the reference point. The laser resonant cavity length is altered and measurements of $d_n$ are made for each known corresponding value of $\Delta f$. Sufficient data is therefore provided for a simultaneous solution for D of a set of equations like (1) with different values of $d_n$ and $\Delta f$. The distance D is therefore determinable. In an alternative arrangement, means are provided for varying the light source output frequency through the range of frequency $\Delta f$ and for electrically counting the number of minimas, N, generated during this sweep.

These and other objects of the invention will become apparent with reference to the following specifications and drawings wherein:

FIG. 2 is a diagram illustrating widely spaced frequencies $f_1$ and $f_2$ generated simultaneously for a particular resonant cavity length by a laser light source included in the apparatus of FIG. 1;

FIG. 3 is a diagram illustrating an arrangement for varying the resonant cavity length of the laser light source of FIG. 1;

FIG. 4 is a side view of the laser light source in FIG. 3;

FIG. 5 is a diagram of light intensity of the combined reflected beams versus linear path difference traveled by beams in the distance measuring apparatus of FIG. 1.

Figure 1:
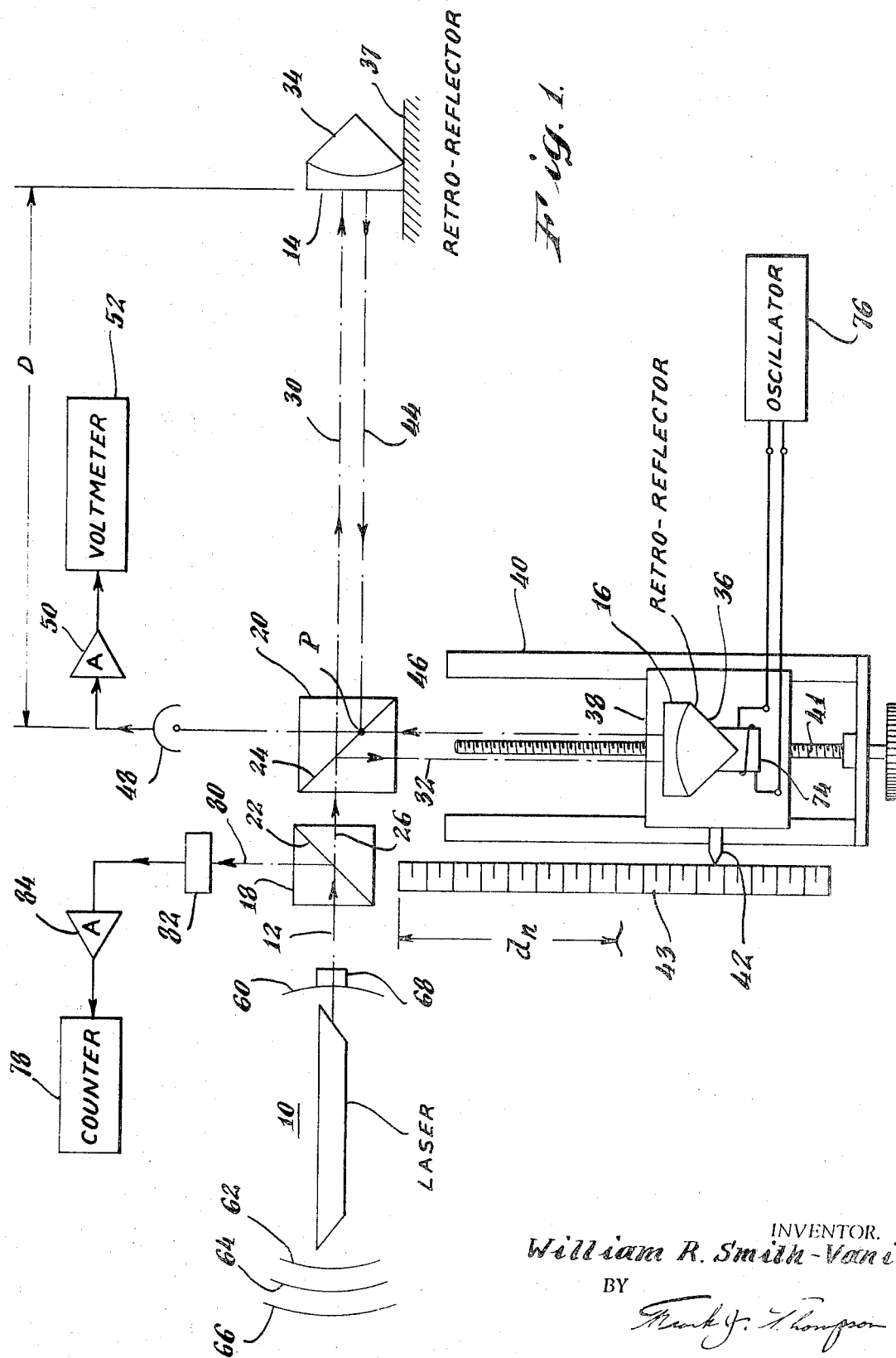
FIG. 1 is a diagram illustrating a distance measuring apparatus constructed in accordance with features of this invention.

In FIG. 1, a distance measuring apparatus is shown to include a laser light source 10 which is arranged for generating a light beam 12 and for projecting portions of the beam at a target reflective surface 14 and a locally positioned reference reflective surface 16. The beam 12 is divided by beam splitting means 18 and 20 which are positioned in the path of the generated beam. Each of the beam splitters includes a half-silvered surface 22 and 24 respectively and is adapted for transmitting and reflecting portions of an incident beam. A component 26 of the beam 12 which is transmitted by the beam splitting means 18 impinges on the surface 24 of the beam splitter 20 and is divided into a transmitted component 30 and a reflected component 32. These latter components are projected at and impinge upon the reflective surfaces 14 and 16 respectively.

The reflective surfaces 14 and 16 are formed by conventional retroreflectors 34 and 36, each of which comprises a plurality of reflective surfaces arranged for reflecting an incident beam along a parallel path. Retroreflector 34 is positioned at a target object whose distance D from a reference point P on the surface 24 is to be measured. The target is indicated generally as the surface 37. Retroreflector 36 is mounted on a carriage 38 which can be adjustably positioned on a track 40 by a screw 41. Means comprising an indicator 42 and a scale 43 provide an indication of the distance $d_n$ of the reflective surface 36 from the point P. The beams 30 and 32 are reflected by these retroreflectors and are combined at the surface 24 of the beam splitter 20. These reflected beams bear reference numerals 44 and 46 respectively. The light field formed by the combination of these reflected beams falls on a photocell 48 and electrical variations corresponding to the light field intensity are thereby generated. These electrical variations are amplified by the amplifier stage 50 and are coupled to a voltmeter 52 for providing a visual indication of relative field intensity as the carriage 38 is adjusted on its track.

The laser light source 10 comprises a conventional gaseous laser having a cavity formed by a partially transmissive surface 60 and one of the plurality of reflective surfaces illustrated in FIG. 1 as the reference numerals 62, 64 and 66. As indicated in greater detail hereinafter, the surfaces 62, 64 and 66 are selectively positioned for varying the cavity length of the laser light source. The surface 60 is mechanically coupled to a conventional pusher 68 for providing fine adjustment of the cavity length. FIG. 2 illustrates the frequency spectrum of the laser light source for a particular cavity length. This condition exists when the cavity length is adjusted to an odd multiple of $\lambda/4$ at the line center frequency, where $\lambda$ is the wavelength of the line center frequency. It can be seen that two distinct output frequencies, $f_1$ and $f_2$, are provided for each particular cavity length of the laser. The use of alternate reflective surfaces will provide different cavity lengths and a laser light output having other distinct frequencies.

The combination of the beams 44 and 46 at the surface 24 results in an interference pattern characterized by variations in light field intensity. Because the reflected beams being combined each include the frequency components $f_1$ and $f_2$, the intensity variations of the combined light field corresponding to variations in the distance of the reference retroreflective surface 16 from the reference point P occur as shown in FIG. 5. In FIG. 5, the ordinate represents the intensity of the light field at the surface 24 while the abcissa is expressed in terms of the path difference traversed by the propagated beams 30 and 32. The individual intensity cycles are not shown to scale. The amplitude of the envelope of the intensity variations is a measure of contrast. The difference in frequency between $f_1$ and $f_2$ as illustrated in FIG. 2 is for a 6,328 gaseous laser and is on the order of 1,000 mc. Accordingly, the resolution obtainable with this arrangement, to a first order is approximately 6 inches and interpolation within this can be accordingly made by adjustment of the screw 41 to detect the minima 70 of the waveform shown in FIG. 5. This minima is extremely sharp if the amplitudes of $f_1$ and $f_2$ are exactly equal, a condition which can be achieved by a fine adjustment of the cavity length through pusher 68.

It is desirable to employ photoelectric means such as the photocell 48 (FIG. 1) for providing an electrical output indication of the maxima 72 (FIG. 5) and the minima 70, and the voltmeter 52 to provide a visual indication of their occurrences. Contrast is measured by comparing maxima and minima of intensity. The photocell generates an a.c. signal proportional to contrast. In addition, means are provided for vibrating the reflective surface 16. These means may comprise an electromechanical transducer coil 74 which is rigidly attached to the reflective surface 16. In this regard, the retroreflector 36 is mounted on the carriage 38 having conventional resilient material such as styrofoam. Audio oscillator 76 applies electrical energy to the coil for causing the reflective surface to vibrate.

As indicated hereinbefore, the desired quantity to be measured is D as given by equation (1) above. The unknowns in addition to D are N, the number of minimas of intensity occurring over the interval D and the quantity $d_n$ representing the reference path length at which the minima is obtained.

In operation, the laser 10 is arranged to include a one of the reflective surfaces 62, 64, 66 for providing a resonant cavity in cooperation with the surface 60. By accurately fabricating this resonant cavity in a known manner, the frequencies $f_1$ and $f_2$ are approximately predetermined. However, in practice, the anomalous dispersion of the plasma affects the frequency difference and for this reason a counter 78 is provided for indicating $\Delta f$. The beam splitting means 18 (FIG. 1) reflects a portion 80 of the beam 12. Combined photodetection means 82 are positioned in the path of the reflected beam 80 and the component frequencies $f_2$ and $f_1$ of the beam 80 heterodyne to generate $\Delta f$. Although the frequencies $f_2$ and $f_1$ are in the light spectrum, $\Delta f$ is on the order of about 1,000 mc. and will generate a detectable output. Amplifying means 84 are provided for amplifying and coupling the frequency $\Delta f$ to the counter 78. Thus, an accurate indication of the frequency difference between the frequencies $f_2$ and $f_1$ is provided. By alternating the reflective surfaces 62, 64 and 66 so as to vary the cavity length and by noting the quantity $d_n$ required for establishing a minima of intensity 70 in the light field at surface 24, a system of simultaneous equations can be established and the quantity D determined. Thus, a distance measuring apparatus having relatively high degree of accuracy over intermediate and long ranges is provided.

FIGS. 3 and 4 illustrate a typical arrangement for varying the resonant cavity length of the laser 10. In fig. 4, a tubular housing 86 of the laser 10 is shown supported with respect to a turret 88, which is rotatably mounted and which includes reflective surfaces 62 and 64. For clarity, the two surfaces 62 and 64 are shown in FIG. 4 whereas FIG. 3 illustrates the additional reflective surface 66 supported by the turret 88. By rotating the turret 88, a one of the plurality of reflective surfaces will be positioned rearwardly of the laser as viewed in FIG. 1, and, in conjunction with the partially transmissive surface 60, defines a particular resonant cavity length.

Figure 6:
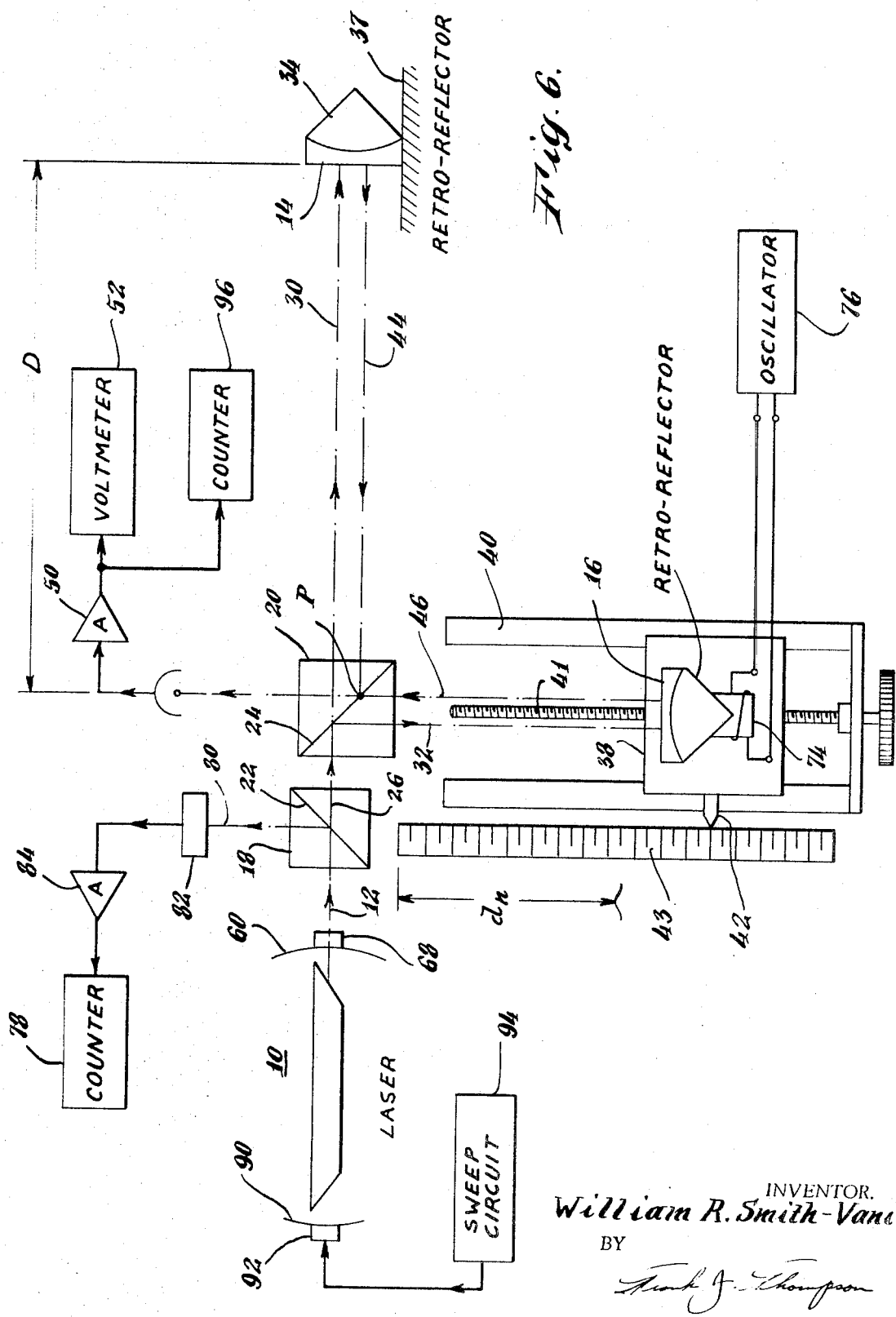
FIG. 6 is a diagram of an alternative embodiment of a distance measuring apparatus constructed in accordance with features of this invention.

An alternative embodiment of the present invention is illustrated in FIG. 6. This arrangement eliminates the requirement for successive measurement of $d_n$ as described with respect to the apparatus of FIG. 1. Elements of FIG. 6 performing similar functions illustrated in FIG. 1 bear the same reference numerals. It can be seen from FIG. 6 that the plurality of reflective surfaces 62, 64 and 66 of FIG. 1 are replaced by a single surface 90 which can be axially displaced by a conventional rigidly attached pusher mechanism 92. The pusher mechanism is well known and is electrically excited by voltages derived from a sweep circuit 94. In addition, an electronic counter 96 is coupled to the photocell 48 for counting maximas of intensity, as the laser 10 is swept by the sweep circuit and pusher through the range of frequencies $f_1$ and $f_2$. The position of the retroreflector 36 from the point P is adjusted for minimum contrast as illustrated by the minima 70 in FIG. 5 and as indicated by the voltmeter 52. The frequency deviation, $\Delta f$ as indicated by the counter 96 is noted along with the dimension $d_n$. The reference retroreflector 36 is now normal to a position corresponding to a contrast maxima 72. This accordingly removes the term $1.C/2.2\Delta f$ from the expression of equation (1) for distance. The pusher 92 is then excited by the sweep circuit 94 and causes the laser to sweep through the range $f_1$ and $f_2$. The number of maximas 72 occurring during this sweep is detected by the photocell 48 and is indicated by the counter 96. N, which here represents the number of maximas, is read directly from the counter 96 and the distance D can be calculated by insertion of the values N, $d_n$, and $\Delta f$, as determined during the measurement, in equation (1). The apparatus of FIG. 6 is therefore advantageous in that it eliminates the requirement of repetitive measurements as recited with respect to FIG. 1. By continuing the pusher excursion further for a total number of orders M, the number of counts expected can be increased to MN, helping to resolve any uncertainties as to the exact value of the integer N.

A distance measuring apparatus has been described employing a laser light source providing an output beam including components at two differing frequencies. It is at times advantageous to employ more than two distinct frequencies.

With an arrangement of this type, the frequency separations will be integral multiples of a particular frequency. The contrast maxima would then be measured rather than the contrast minima.

A distance measuring apparatus has thus been described which advantageously provides relatively accurate indications of range over intermediate and relatively long distances.

While I have illustrated and described a particular embodiment of my invention, it will be understood that various modifications may be made therein without departing from the spirit of the invention and the scope of the appended claims.

I claim:

1. An apparatus for measuring the distance to a remote object having a target reflective surface positioned at the object comprising:

a locally positioned reference reflective surface;

a coherent light source adapted for generating a light beam having simultaneously occurring components of differing frequencies $f_1$ and $f_2$;

means for varying the frequencies $f_1$ and $f_2$;

means for causing portions of said light beam to impinge upon the target and reference reflective surface and to be reflected thereby; and means including said reference reflective surface for combining the reflected beams in a manner for establishing a light field of adjustable contrast.

2. The apparatus of claim 1 wherein said coherent light source comprises a laser having a cavity length L and said means for varying the frequencies of said components comprises means for varying the cavity length.

3. The apparatus of claim 2 wherein said laser light source includes a reflective surface for determining the resonant cavity length and said means for varying said resonant cavity length comprises means for cyclically varying the position of said reflective surface.

4. An apparatus for measuring the distance to a remote object having a target reflective surface positioned at the object, comprising:

a locally positioned reference reflective surface;

a coherent light source adapted for generating a light beam having simultaneously occurring components of differing frequencies $f_1$ and $f_2$, said light source including means for varying a difference in frequency $\Delta f$ between the frequencies $f_1$ and $f_2$;

means for causing portions of said light beam to impinge upon said target and said reference reflective surface and to be reflected thereby;

means including said reference reflective surface for combining the reflected beam in a manner for establishing a light field of adjustable contrast;

means providing a reference point in said apparatus; and means for measuring a displacement $d_n$ of said reference reflective surface from said reference point.

5. An apparatus for measuring the distance to a remote object, comprising:

a laser light source, including a resonant cavity, adapted for generating a light beam having simultaneously occurring frequency components of frequency $f_1$ and $f_2$ which differ in frequency by an amount $\Delta f$;

means for varying said resonant cavity length for providing two or more cavity lengths at which the corresponding $\Delta f$ differs;

a target reflective surface positioned at said object;

a locally positioned reference reflective surface;

partially transmissive beam splitting means including a reflective surface adapted for partially transmitting and reflecting said light beam and arranged for projecting portions of said light beam at said target and reference reflective surfaces;

means providing a reference point for said apparatus;

means adjustably mounting said reference reflective surface for varying the position thereof from said reference point;

said beam splitting, target, and said reference reflective surfaces respectively arranged for causing the incident beams which are projected at said reference and reflective surfaces to be reflected and to combine at said beam splitting surface; and means for measuring a distance $d_n$ of said reference reflective surface from said reference point.

6. The apparatus of claim 5 wherein said means for varying said cavity length comprises means for establishing two or more substantially fixed resonant cavity lengths.

7. The apparatus of claim 6 wherein said resonant cavity is formed by a first reflective surface positioned axially adjacent one end of a laser element envelope and a plurality of reflective surfaces adjustably positioned near an opposite end of said envelope and adapted to be rotated to an axial position at the end of said envelope.

8. The apparatus of claim 5 including means for electronically measuring and indicating the frequency difference $\Delta f$.

9. The apparatus of claim 8 including photoelectric means positioned with respect to said beam splitting reflective surface and an electric indicating means coupled to said photoelectric means for indicating the contrast of the light field at said surface.

10. The apparatus of claim 5 including means for vibrating said reference reflective surface.

11. An apparatus for measuring the distance to a remote object having a target reflective surface positioned at the object, comprising:

a locally positioned reference reflective surface;

a coherent light source adapted for generating a light beam having simultaneously occurring components of differing frequencies $f_1$, $f_2$ and $f_3$;

means for varying the frequencies $f_1$, $f_2$ and $f_3$;

means for causing portions of said light beam to impinge upon the target and reference reflective surface and to be reflected thereby; and means including said reference reflective surface for combining the reflected beams in a manner for establishing a light beam of adjustable contrast.